UNITED STATES PATENT OFFICE.

JOHN OWEN FORD, OF JACKSONVILLE, TEXAS.

SUPPORTING-STAKE.

No. 904,769.    Specification of Letters Patent.    Patented Nov. 24, 1908.

Application filed June 23, 1908. Serial No. 440,040.

*To all whom it may concern:*

Be it known that I, JOHN OWEN FORD, a citizen of the United States, residing at Jacksonville, in the county of Cherokee and State of Texas, have invented a new and useful Supporting-Stake, of which the following is a specification.

This invention relates to supporting stakes and is particularly designed for use in supporting tomato plants and similar vegetable growths.

The object of the invention is to provide a stake which is of simple and durable construction, which can be readily placed in position within the ground and which has novel means whereby a plant can be quickly fastened thereto or unfastened therefrom.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a perspective view of the device in use. Figs. 2 and 3 are detail views of modified forms.

Referring to the figures by characters of reference, 1 designates a stem preferably formed of a length of stiff wire coiled as indicated at 2 and provided with an upstanding integral arm 3 projecting from the coil and terminating in a coil 4, the upper terminal of the wire being preferably twisted about the arm 3, as shown at 5. These two coils form spring clips or clamping devices. Secured to each coil is one end of a cord or other tie device 6 and the other end of the cord is knotted as at 7.

In using the device for the purpose of supporting a tomato plant or the like stem 1 is forced into the ground a suitable distance, after which the cords 6 are placed about the upper and middle portions of the plant and the knotted ends of the cord are then drawn downward between the whirls of the coils as shown in the drawing, the ends 7 preventing the cords from pulling out of place within the coils. Obviously, the cords can be quickly secured about the plant in this manner and can be very quickly detached from the plants simply by pulling the knotted ends upward from between the whirls.

Although in the drawing two coils have been shown upon the stake it is to be understood that if preferred only one coil can be employed or more than two can be utilized, this of course depending upon the sizes of the plants to be supported. The stakes can be manufactured very cheaply and are advantageous because of their durability and the rapidity with which they can be set up and attached to or detached from the plants.

Instead of forming the device as shown in Fig. 1 the stem 8 can be provided with a crooked head 9 as illustrated in Fig. 2 and if preferred, the end of the crooked portion can be inturned as shown at 10 in Fig. 3. Various other changes can be made without departing from the spirit of the invention.

What is claimed is:

1. A plant supporting stake comprising a stem, a spring coil thereon, and a flexible plant engaging element secured to the stake and having a knotted end detachably engaging the coil.

2. A plant supporting stake comprising a stem, a spring coil thereon, and a flexible plant engaging element secured to the stake, said element having a knotted end and insertible between and disposed to be frictionally engaged by the whirls of the coil.

3. A plant supporting stake comprising a stem, superposed spring coils integral therewith, and a flexible plant engaging element secured to each coil, each element having one end portion insertible between and disposed to be frictionally engaged by the whirls of one of the coils.

4. A plant supporting stake comprising a stem, a spring coil thereon, and a flexible plant engaging element secured to the coil and having one end insertible between and disposed to be frictionally engaged by the whirls of the coil.

5. A plant support comprising a stem, said stem having an integral clamping device at one end, and a cord secured at one end to the stem, the other end of said cord being insertible into and disposed to be frictionally engaged and held by the clamping device.

In testimony that I claim the foregoing as my own, I have hereto affixed my signature in the presence of two witnesses.

JOHN OWEN FORD.

Witnesses:
T. B. HUNT,
WILSON DOUGLASS.